(12) United States Patent
Tanaka et al.

(10) Patent No.: US 7,601,031 B2
(45) Date of Patent: Oct. 13, 2009

(54) MEMORY CARD ADAPTER

(75) Inventors: Hirohisa Tanaka, Tsu (JP); Yutaka Nakamura, Kyoto (JP)

(73) Assignee: Matsushita Electric Works, Ltd., Kadoma (JP)

( * ) Notice: Subject to any disclaimer, the term of this patent is extended or adjusted under 35 U.S.C. 154(b) by 95 days.

(21) Appl. No.: 11/660,216

(22) PCT Filed: May 9, 2006

(86) PCT No.: PCT/JP2006/309295

§ 371 (c)(1),
(2), (4) Date: Feb. 15, 2007

(87) PCT Pub. No.: WO2006/121033

PCT Pub. Date: Nov. 16, 2006

(65) Prior Publication Data

US 2008/0171473 A1    Jul. 17, 2008

(30) Foreign Application Priority Data

May 12, 2005   (JP) .............................. 2005-140111

(51) Int. Cl.
*H01R 24/00*   (2006.01)
(52) U.S. Cl. .................................................... 439/626
(58) Field of Classification Search ................. 439/630, 439/638, 626, 660, 945; 235/492; 711/115; 710/62; 343/833, 702
See application file for complete search history.

(56) References Cited

U.S. PATENT DOCUMENTS

| 6,264,506 | B1 * | 7/2001 | Yasufuku et al. ............ 439/638 |
| 2002/0032813 | A1 * | 3/2002 | Hosaka et al. ................ 710/62 |
| 2003/0213849 | A1 * | 11/2003 | Luu .......................... 235/492 |
| 2004/0008498 | A1 | 1/2004 | Tanaka et al. |
| 2004/0140896 | A1 | 7/2004 | Ohkawa et al. |

FOREIGN PATENT DOCUMENTS

| JP | 04-360296 | 12/1992 |
| JP | 06-127182 | 5/1994 |

(Continued)

OTHER PUBLICATIONS

Japanese Examination Report dated Jun. 2, 2009, issued in JP2005-140111.

*Primary Examiner*—Alexander Gilman
(74) *Attorney, Agent, or Firm*—Edwards Angell Palmer & Dodge LLP

(57) ABSTRACT

A compact memory card adapter, which improves connection reliability with an antenna circuit and ensures communication distance when a memory card with a non-contact communication function is inserted therein. The adapter is formed with a base made of an electrical insulating material, a plurality of contacts arranged on an inner surface of the base so as to electrically contact an I/O connecting terminal and an antenna connecting terminal of the memory card inserted in the adapter, and an antenna circuit formed on an outer surface of the base. The contact connectable to the antenna connecting terminal of the memory card has a spring piece at its one end, which elastically contacts the antenna connecting terminal of the memory card, and the other end inserted into a through hole formed in the base to make an electrical connection with the antenna circuit.

8 Claims, 4 Drawing Sheets

FOREIGN PATENT DOCUMENTS

| | | |
|---|---|---|
| JP | 11-219418 | 8/1999 |
| JP | 2000-214970 | 8/2000 |
| JP | 2002-517047 | 6/2002 |
| JP | 2002-279377 | 9/2002 |
| JP | 2002-298095 | 10/2002 |
| JP | 3093409 | 2/2003 |
| JP | 2003-223628 | 8/2003 |
| JP | 2004-62854 | 2/2004 |
| JP | 2004-085402 | 3/2004 |
| JP | 2004-133843 | 4/2004 |
| JP | 2004-227046 | 8/2004 |
| WO | WO-2005/004047 | 1/2005 |

* cited by examiner

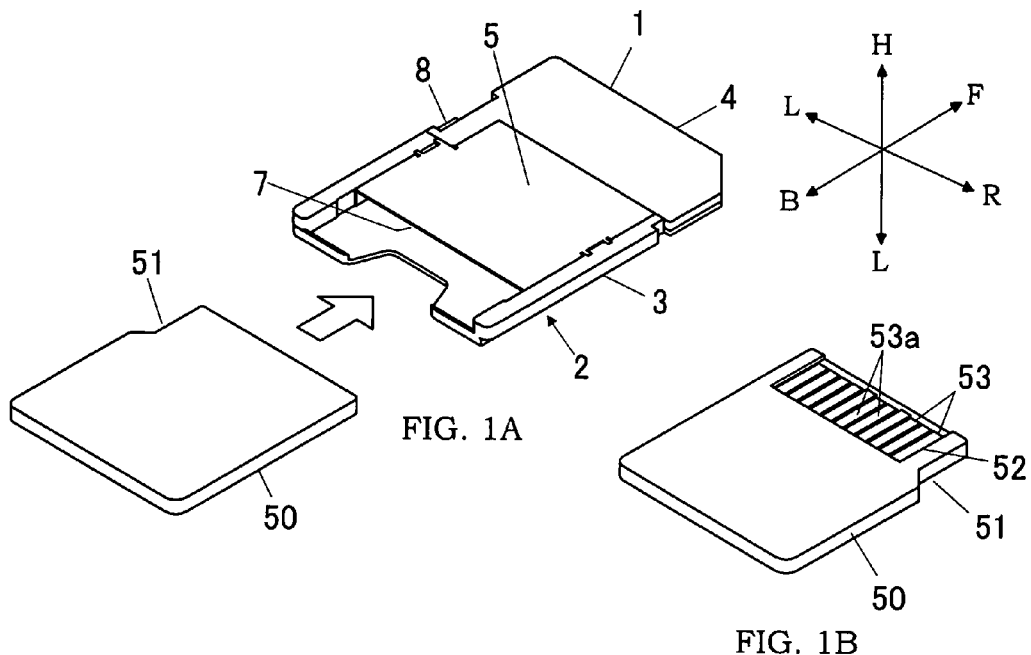
FIG. 1A
FIG. 1B
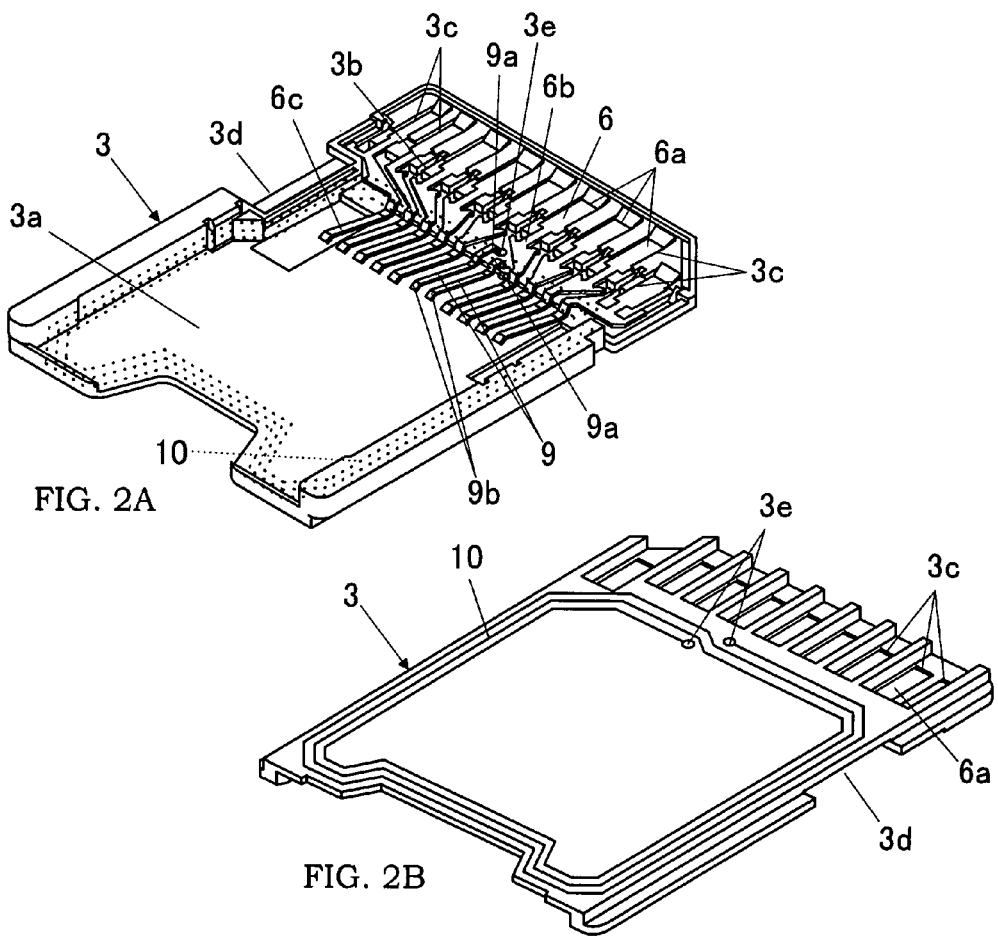
FIG. 2A
FIG. 2B

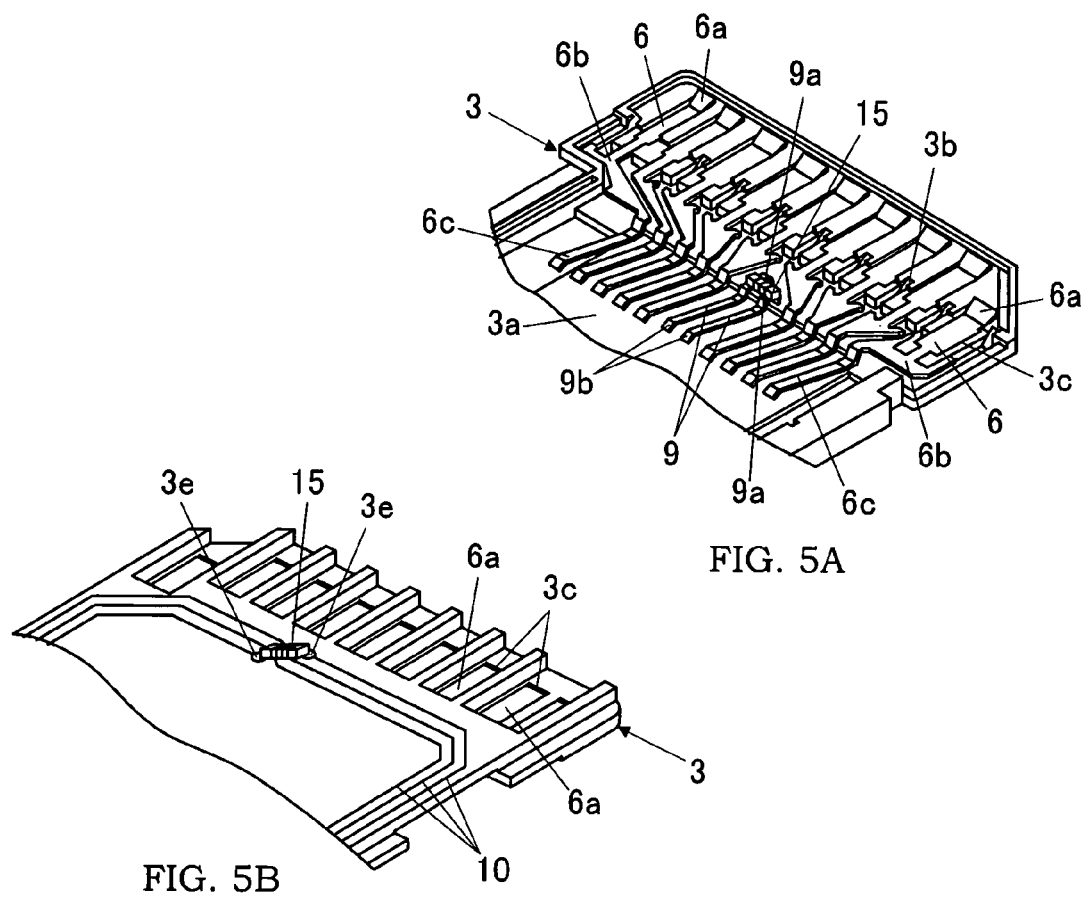
FIG. 5A
FIG. 5B
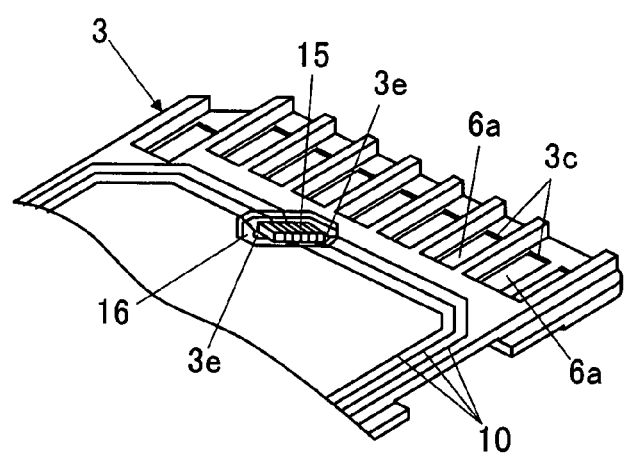
FIG. 6

MEMORY CARD ADAPTER

BACKGROUND OF THE INVENTION

The present invention relates to a memory card adapter, which makes a smaller memory card available to an electronic appliance having a socket for memory card.

DESCRIPTION OF THE RELATED ART

In recent years, as a data storing means of electronic appliances such as digital cameras and mobile phones, memory cards having a built-in nonvolatile memory such as flash memory, for example, SD Memory Card and MultiMedia Card are rapidly becoming pervasive. In addition, due to downsizing of the electronic devices such as mobile phones, Mini SD Card and Micro SD Card, which are smaller in size than SD Memory Card, have been also proposed. Furthermore, there are so-called Smart SD Card and Mini Smart SD Card, which are respectively SD Card and Mini SD Card with a non-contact communication function. These are being developed to be put into practical use as a large-capacity memory card, which is an alternative to conventional non-contact IC cards.

By the way, when an antenna is built in this kind of memory card, the receiver sensitivity of the antenna becomes poorer due to the small size of the memory card in itself. Therefore, it is an important subject for study to extend the communication distance. For example, Japanese Patent Early Publication No. 2002-279377 discloses an adaptor, by which a plug-in type IC card becomes available in a contact manner or in a non-contact manner. A card-like housing of this adaptor is a substantially same size as a conventional credit card, and has a storage portion for accommodating the plug-in type IC card. The communication distance is ensured by building an antenna coil in the card-like housing.

However, when the antenna having a sufficient size for ensuring the communication distance is built in the adapter, an increase in size of the adapter in itself is inevitable. As a result, allowing a user to carry such a large size adapter leads to a decrease in portability that is an advantage of the compact memory card. In addition, it is needed to mount a relatively large connector in the electronic appliance such that the adaptor having the substantially same size as the credit card can be accommodated therein. Therefore, it is anticipated that it becomes necessary to newly design and develop a connector specialized for the adaptor, or the installation of such a large connector leads to an increase in size of the electronic appliance in itself.

SUMMARY OF THE INVENTION

In view of the above problems, a primary concern of the present invention is to provide a memory card adapter, which has the capability of improving the reliability of electrical connection between an antenna circuit and a connecting terminal of a memory card, and ensuring a desired communication distance when the memory card with a non-contact communication function is inserted therein.

That is, the memory card adapter of the present invention is connectable to a memory card socket of an electronic appliance, and has a loading port at its one end, through which a memory card can be accommodated therein. The memory card adapter comprises a base made of an electrical insulating material, a plurality of contacts arranged on an inner surface of the base so as to electrically contact an I/O connecting terminal and an antenna connecting terminal of the memory card inserted in the adapter, an antenna circuit formed on an outer surface of the base, and a conductive member configured to make an electrical connection between the contact connectable to the antenna connecting terminal of the memory card and the antenna circuit via a through hole formed in the base. As an exemplary embodiment for the formation of the electrical connection, the contact connectable to the antenna connecting terminal has a spring piece at its one end, which elastically contacts the antenna connecting terminal of the memory card, and the other end inserted as the conductive member into the through hole to make the electrical connection with the antenna circuit.

According to the present invention, when the memory card is inserted into the adapter, the electrical connection between the antenna circuit and the antenna connecting terminal of the memory card can be reliably provided by use of the contact disposed in the adapter and the conductive member disposed in the through hole of the base. Therefore, when the memory card with the non-contact communication function is inserted into the adapter, it is possible to extend the communication distance by use of the antenna circuit formed as a secondary antenna in the adapter. In addition, since the contact is electrically connected to the antenna circuit on the outer surface of the base via the through hole, there is an advantage that the antenna circuit can be easily formed by means of printing and so on. For example, even when a loop-like antenna pattern having plural turns is formed on the outer surface of the base, it is possible to planarize the antenna pattern without making any crossing with an overpass or underpass by forming the through holes at positions corresponding to both ends of such a loop-like antenna pattern. Specifically, when using the contact having the spring piece at its one end, which elastically contacts the antenna connecting terminal of the compact memory card, and the other end, which is inserted in the through hole to make the electrical connection with the antenna circuit, there are advantages of a reduction in the total number of parts of the adapter, and a reduction in production cost, in addition to the advantage that the above-described effects can be stably achieved. Furthermore, there is another advantage that a conventional connecting method such as press fitting and soldering is available to connect the other end of the contact with the antenna circuit.

In the above-described adapter, it is preferred that the antenna circuit has a loop-like antenna pattern formed along an outer circumference of the base. In this case, by appropriately determining the positions of through holes, in each of which the conductive member is disposed, it is possible to obtain a loop-like planar antenna pattern without making any crossing with an overpass or underpass. Therefore, it is possible to efficiently form a relatively large antenna pattern on the outer surface of the base, and provide a further extension of the communication distance.

In addition, it is preferred that a magnetic material is disposed between the antenna circuit and the outer surface of the base. In this case, since magnetic flux density is increased by the presence of the magnetic material between the antenna circuit and the compact memory card, it is possible to improve the antenna property.

In addition, it is preferred that an electrical insulating layer is formed on a surface of the antenna circuit. In this case, when the memory card adapter is connected to the memory card socket, it is possible to prevent from occurring a short-circuit accident between the antenna circuit and a metal part of the socket.

It is also preferred that the antennal circuit has an electronic part for regulating a high-frequency property. In this case, the high-frequency property of the antenna circuit can be regulated by the electronic part. In addition, it is preferred that the base has a concave, in which the electronic part is mounted. Since an efficient layout of the electronic part in a limited space is achieved by mounting the electronic part in the concave, it is useful to further downsize the adapter.

It is further preferred that the base having the antenna circuit of the adapter of the present invention is a molded interconnect device, which is obtained by integrally molding a desired circuit pattern with a resin material for the base. In this case, by utilizing the molded interconnect device technology to produce the base having the antenna circuit, the body shape of the adapter and the position of the through hole can be optionally designed depending on the kind of memory card to be inserted in the adapter.

Further characteristics of the present invention and advantages brought thereby will become more apparent from the best mode for carrying out the invention described below.

BRIEF DESCRIPTION OF THE DRAWINGS

FIG. 1A is a perspective view of a memory card adapter according to a preferred embodiment of the present invention, and FIG. 1B is a perspective view showing a terminal arrangement of the memory card;

FIG. 2A is a perspective view of an internal structure of the adapter, and FIG. 2B is a perspective view of an antenna circuit formed on an outer surface of a base of the adapter;

FIG. 5A is a partially perspective view of the base having an electronic part mounted on its inner surface, and FIG. 5B is a partially perspective view of the base having the electronic part mounted on its outer surface; and FIG. 6 is a partially perspective view of the base having a concave, in which the electronic part is mounted.

DETAILED DESCRIPTION OF EXEMPLARY EMBODIMENTS

Figure 3A:
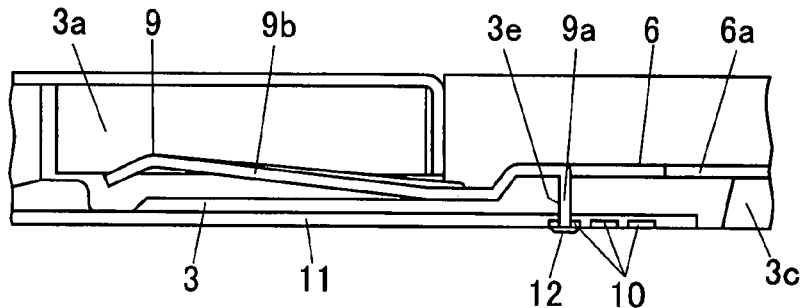
FIGS. 3A to 3C are schematic views showing means of making an electrical connection between the antenna circuit and a contact disposed in the adapter.

A memory card adapter of the present invention is explained in detail according to exemplary embodiments. In the attached drawings, a "HL" direction means a high and low direction a "FB" direction means a forth and back direction (a direction of inserting and pulling out the memory card), and a "LR" direction means a left and right direction.

As shown in FIGS. 1A, 1B and 2A, the memory card adapter 1 of the present embodiment is mainly composed of a base 3, a cover 4, a metal shell 5, nine contacts 6 that are connectable to nine I/O connecting terminals 53 of a memory card 50 (Mini Smart SD Card used in this embodiment), two contacts 9 that are connectable to two expansion terminals 53a of the memory card, and a write protection knob 8.

As shown in FIGS. 1A and 1B, the Mini Smart SD Card 50 has a substantially rectangular flat plate shape, which is one size smaller in outside dimension than SD Memory Card. The numeral 51 designates a cut portion, which is formed at one side of a forward edge portion of the memory card inserted in the adapter 1. In addition, the numeral 52 designates a recess formed in the reverse side of the Mini Smart SD Card 50. In the recess 52, the plural terminals 53, 53a (the Mini Smart SD Card 50 has eleven terminals) are arranged in parallel. In consideration of a future expandability, the Mini Smart SD Card 50 has two additional I/O connecting terminals, as compared with SD Memory Card. The two terminals 53a shown at a center region in FIG. 1B correspond to the two additional terminals (antenna connecting terminals) for expansion functions.

The base 3 is a synthetic resin molded product, which is formed such that an inner surface profile of the base shown in FIG. 2A substantially corresponds to a profile of one surface of the Mini Smart SD Card 50. The numeral 3a designates a card storage portion caved in a substantially rectangular shape at a side of the loading port of the memory card, and the numeral 3b designates a connector storage portion formed at the opposite side of the loading port. Nine rectangular openings 3c passing through the base 3 in the thickness direction are formed in the connector storage portion 3b so as to be arranged in the left and right direction ("LR" direction). The numeral 3d designates a locking notch formed at one side in the left and right direction of the base 3. The write protection knob 8 is slidably fitted in the locking notch 3d.

The cover 4 is a synthetic resin molded product, which is formed to substantially correspond to a profile of the other surface of the forward edge portion of the Mini Smart SD Card 50. The cover 4 is connected to the base 3 to cover the connector storage portion 3b and the locking notch 3d of the base 3. In addition, the card storage portion 3a of the base 3 is covered by the metal shell 5. Thus, the main body 2 of the adapter is formed with the base 3, the cover 4 and the metal shell 5. In addition, a space (the card storage portion 3a) surrounded by the base 3, the cover 4 and the metal shell 5 is used as a card storage room, into which the Mini Smart SD Card 50 can be inserted. The loading port 7 is provided by an opened space between the base 3 and the metal shell 5.

Attached to the base 3 are the nine contacts 6, which can be connected to the I/O connecting terminals 53 of the Mini Smart SD Card 50, and the two contacts 9, which can be connected to the antenna connecting terminals 53a of the Mini Smart SD Card 50. Each of the contacts 6 is integrally formed with a terminal piece 6a, a contact spring piece 6c and a fixing piece 6b. The terminal piece 6a is a substantially rectangular strip formed by bending one end of the contact 6 in an obliquely upward direction. The contact spring piece 6c is provided by the other end of the contact 6 projecting toward the card storage room. The fixing piece 6b extends between the terminal piece 6a and the contact spring piece 6c. Each of the contacts 6 is fixed in the main body 2 of the adapter by connecting the cover 4 with the base 3 under the condition that the fixing piece 6b is sandwiched between the base 3 and the cover 4. At this time, the terminal piece 6a of each contact 6 is exposed to the outside through the rectangular opening 3c of the base 3. In addition, the contact spring piece 6c of each contact 6 projects in the card storage portion 3a, and is inclined in an oblique direction such that a distance between the metal shell 5 and the contact spring piece 6c becomes shorter as it neared a tip portion.

In the contact storage portion 3b of the base 3, there are two through holes 3e for the two antenna connecting terminals 53a of the Mini Smart SD Card 50. On the outer surface of the base 3 (the outer surface of the main body 2 of the adapter), an antenna pattern 10 is formed to extend from one of the through holes 3e as a starting point to the other through hole 3e as a finishing point in a loop-like manner by plural turns (e.g., 3 turns). In the embodiment shown in FIG. 3A, a flexible printed board 11 having the antenna pattern 10 is adhered to the outer surface of the base 3. Alternatively, the antenna pattern may be formed on the outer surface of the base 3 by using a printing technology such as screen printing and inkjet printing.

On the other hand, as shown in FIGS. 2A and 3A, each of the two contacts 9 connectable to the antenna connecting terminals 53a is integrally formed with a fixing piece 9a having a reverse J-shaped configuration and an elastic spring piece 9b. A vertical rod portion of the fixing piece 9a is inserted in the through hole 3e formed in the connector storage portion 3b of the base 3, and then soldered to the through hole 3e. The elastic spring piece 9b projects from one end of the fixing piece 9a toward the card storage room. The contact 9 is disposed between the base 3 and the cover 4 such that the elastic spring piece 9b projects in the card storage portion 3a under the condition that the fixing piece 9a is inserted into the through hole 3e. The elastic spring piece 9b of each contact 9 projecting into the card storage room is inclined in an oblique direction such that a distance between the elastic spring piece 9b and the metal shell 5 becomes shorter as it neared a tip portion. When the Mini Smart SD Card 50 is inserted in the card storage portion 3a, the elastic spring pieces 9b elastically contact the antenna connecting terminals 53a of the Mini Smart SD Card 50.

A conductive layer (not shown) is formed on an inner peripheral surface of the through hole 3e, and the fixing piece 9a is soldered to an end portion (a lower end of the through hole in FIG. 3A) of the through hole 3e by use of a soldering paste 12 to make an electrical connection between the contact 9 and the antenna pattern 10. Thus, each of the contacts 9 is electrically connected to the antenna circuit 10 formed on the outer surface of the main body 2 of the adapter via the through hole 3e. Therefore, even when the loop-like antenna pattern 10 having the plural turns is formed, it is possible to improve the planarity of the antenna pattern without making any crossing with an overpass or underpass by matching the positions of the through holes 3e with both ends of the antenna pattern. As a result, there is an advantage that the antenna circuit can be easily formed by means of printing and so on. In addition, since the antenna pattern 10 is formed on the outer surface of the main body 2 of the adapter, which has a substantially same shape as the Mini Smart SD Card, it is possible to provide a compact memory card adapter with an external antenna as the secondary antenna without causing an increase in size of the main body 2 of the adapter.

In the above case, since the conductive layer is formed on the entire inner peripheral surface of the through hole 3e, the fixing piece 9a may be soldered to the through hole 3e at the inner-surface side (an upper end of the through hole in FIG. 3A) of the adapter by use of the soldering paste to make the electrical connection between the fixing piece 9a and the through hole 3e. Alternatively, the fixing piece 9a can be electrically connected to any portion in the through hole 3e, for example, at a position close to the outer surface (a lower surface of the base in FIG. 3A) of the adapter or at an intermediate portion in the though hole 3e. Therefore, it is possible to improve the reliability of the electrical connection. In addition, an increase in degree of freedom of mounting the contacts 9 presents an advantage that the base 3 and the contacts 9 can be designed in consideration of easiness of manufacturing.

Figure 3B:
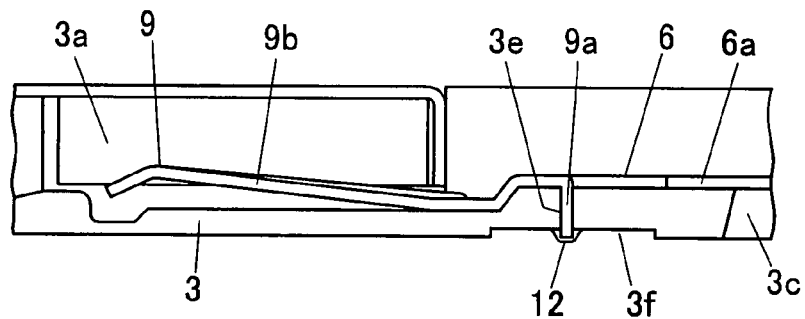
Figure 3C:
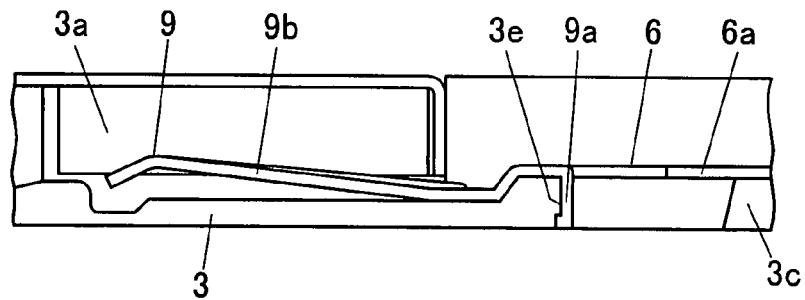

In addition, as shown in FIG. 3B, a recessed portion 3f may be formed around the through hole 3e in the outer surface (the lower surface) of the base 3. In this case, the fixing piece 9a can be connected to the through hole 3e in the recessed portion 3f by use of the soldering paste 12. Alternatively, the fixing piece 9a may be press-fitted into the through hole 3e. In this case, it is preferred to form a notch or the like at the side of the fixing piece 9, and press fit the fixing piece into the through hole 3e. In addition, it is preferred that the contact 9 is more tightly held by swaging the fixing piece 9a in addition to the press fitting. There is an advantage that the contact 9 can be reliably fixed to the base for an extended time period during the fabrication or after the fabrication. In the case of swaging the fixing piece 9a, the fixing piece 9a can be fixed to the base 3 by projecting an end portion of the fixing piece 9a from the through hole 3e at the outer-surface side (the lower-surface side) of the base 3, and then bending it in a lateral direction, as shown in FIG. 3C. Alternatively, the fixing piece 9a can be fixed to the base 3 by crushing the end portion (dowel) of the fixing piece 9a (so-called dowel jointing). It is further preferred to form a V-shaped notch at the end portion of the fixing piece 9a, and expand the width of the V-shaped notch in order to secure the fixing piece 9a to the base 3. In the schematic cross-sectional views of FIGS. 3B and 3C, the illustration of the antenna pattern 10 is omitted.

Figure 4A:
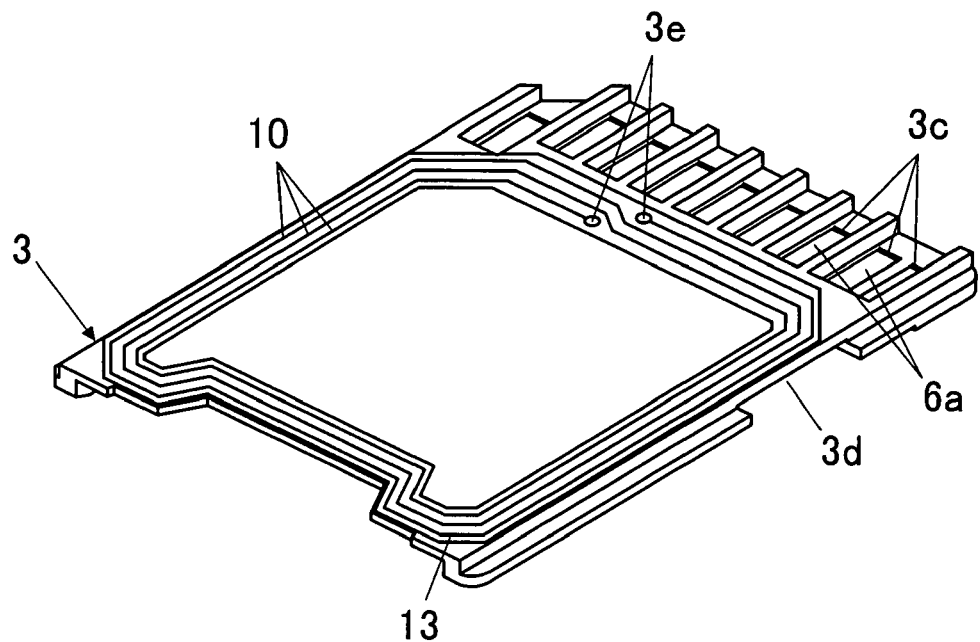
FIGS. 4A and 4B are perspective views of outer surfaces of bases according to modifications of the above embodiment.

By the way, as shown in FIG. 4A, when a magnetic material sheet 13, which is a thin film formed in a rectangular frame shape, is disposed between the base 3 and the antenna pattern 10, the magnetic flux density is increased to extend the communication distance in the non-contact communication. Since the antenna pattern 10 is planarly formed, as described above, the magnetic material sheet 13 can be easily formed between the antenna pattern 10 and the base 3. In addition, it is easy to form the antenna pattern 10 on the magnetic material sheet 13. The magnetic material sheet 13 can be formed only on a region of the base having the antenna pattern 10. Alternatively, the magnetic material sheet 13 may be formed on the entire outer surface (lower surface) of the base 3. In addition, by decreasing the thickness of the base 3, a thickness of the magnetic material sheet 13 can be increased by just that much. The magnetic flux density increases as the magnetic material sheet 13 becomes thick. Therefore, it is possible to further extend the communication distance in the non-contact communication. On the other hand, as the thickness of the base 3 decreases, there is a fear that the strength of the base 3 lowers. In such a case, it is preferred to use a plate-like magnetic material having a high strength in place of the magnetic material sheet 13. In the case of adhering such a plate-like magnetic material plate to the base 3 having a thin thickness, it is possible to ensure the strength of the base 3 and extend the non-contact communication distance. In addition, since the plate-like magnetic material is generally higher in density of magnetic substance than the magnetic material sheet 13, the non-contact communication distance can be further extended due to an increase in magnetic flux density. In place of adhering the magnetic material sheet 13 or the plate-like magnetic material to the base 3, a part of the base 3, on which the antenna pattern 10 is formed, or a substantially entire region corresponding to the outer surface of thee base 3 may be formed by use of the plate-like magnetic material. From the same reason described above, it is preferred to increase a thickness of the plate-like magnetic material from the viewpoint of extending the communication distance.

Figure 4B:
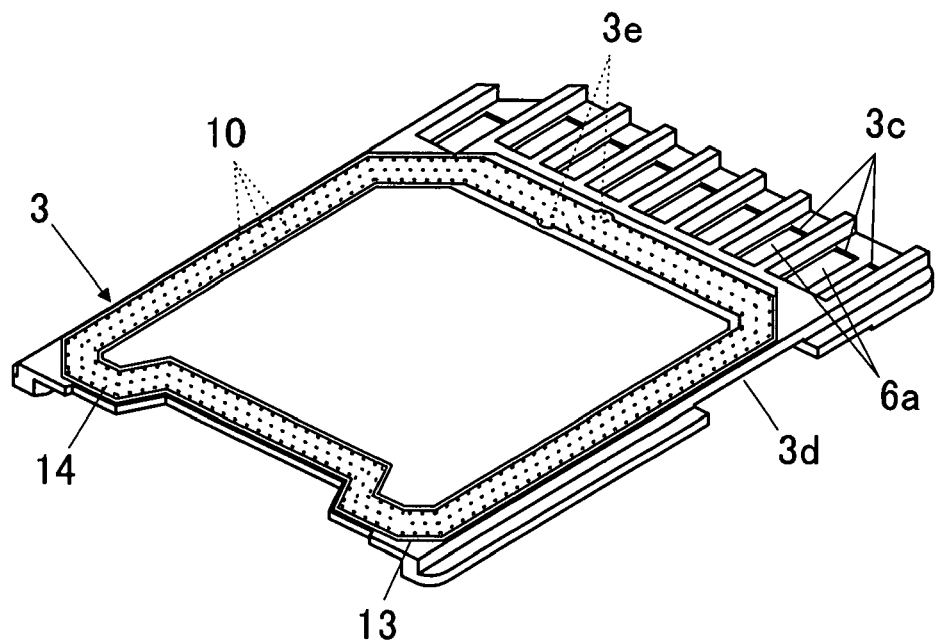

In addition, as shown in FIG. 4B, it is preferred that an insulating layer 14 is formed to cover the surface of the antenna pattern 10. When the memory card adapter 1 is inserted into a connector (not shown) built in an electronic appliance, it is possible to prevent from occurring a short-circuit accident between the antenna pattern 10 and a metal part of the connector by the insulating layer 14 formed on the surface of the antenna pattern 10. The insulating layer 14 can be formed by applying an insulating adhesive agent on the antenna pattern 10. Alternatively, an insulating tape may be adhered to the antenna pattern 10. The insulating layer 14 can be formed only on a region of the base 3 having the antenna pattern 10. Alternatively, the insulating layer 14 may be formed on the entire outer surface of the base 3. In this embodiment, since the antenna pattern is planarly formed, the insulating treatment of applying the insulating adhesive agent or adhering the insulating tape can be completed in one operation. Therefore, there is an advantage of facilitating the step of forming the insulating layer 14.

As a modification of the above embodiment, as shown in FIG. 5A, it is preferred that an electronic part (e.g., chip capacitor) 15 is mounted between the fixing pieces 9a of the two contacts 9 projecting from the through holes 32 toward the interior of the base 3. A high-frequency property of the antenna pattern 10 can be appropriately regulated by this electronic part 15 depending on use conditions. In this case, the antenna pattern 10 and the electronic part 15 construct an antenna circuit.

In the modification shown in FIG. 5A, the electronic part 15 is directly mounted between the fixing pieces 9a of the contacts 9. Alternatively, a circuit for mounting the electronic part 15 may be formed at a region of the base around the through hole 3e. In addition, as shown in FIG. 5B, the electronic part 15 can be mounted between the through holes 3e at the outer-surface side (the lower-surface side) of the base 3. Specifically, as shown in FIG. 6, it is preferred that a concave 16 is formed around the through holes 3e at the outer-surface side of the base 3 such that a depth of the concave is substantially the same as the height of the electronic part 15, and the electronic part 15 is mounted between the through holes 3e in this concave 16. In this case, since the electronic part 15 can be efficiently mounted in a limited space, it is effective to further downsize the adapter.

In the present embodiment, the antenna pattern 10 is formed on the outer surface of the base 3 made of the synthetic resin by printing. Alternatively, the base 3 may be provided by a molded interconnect device (MID) with the antenna circuit formed by means of conductive plating. When a part of the main body 2 of the adapter or the entire main body is formed by the molded interconnect device, the uneven shape of the base 3 and the positions of the through holes 3e can be optionally designed. Therefore, it is possible to manufacture a suitable main body 2 for the adapter with relative ease depending on the kind of memory card to be inserted in the adapter.

In the case of setting the Mini Smart SD Card 50 in the above-described memory card adapter 1, the Mini Smart SD Card 50 is inserted with a proper orientation in the card storage portion 3a through the loading port 7 of the memory card adapter 1. At this time, the I/O connecting terminals 53 of the Mini Smart SD Card 50 electrically contacts the contact spring pieces 6c of the contacts 6, and the Mini Smart SD Card 50 is held in the card storage portion 3a by spring forces of the contact spring pieces 6c. In addition, the expansion terminals 53a of the Mini Smart SD Card 50 are abutted against the elastic spring pieces 9b of the contacts 9, and electrically connected to the antenna pattern 10 through the fixing pieces 9a. On the other hand, when removing the Mini Smart SD Card 50 from the adapter, a user can grasp a part of the Mini Smart SD Card 50 exposed from the loading port 7 with the fingertips, and then easily pull it out from the adapter 1.

As explained in the above, the memory card adapter of the present embodiment is for the Mini Smart SD Card 50. However, the memory card available to the memory card adapter of the present invention is not limited to the Mini Smart SD Card. By utilizing the similar configuration to the present embodiment, it is possible to provide an adapter for Micro Smart SD Card or another memory card with the non-contact communication function.

The above explanation provides an example of the structure of the memory card adapter of the present invention, and therefore the present invention is not limited to the specific structure. Each of the embodiments may be modified within the scope of the invention, if necessary.

INDUSTRIAL APPLICABILITY

As described above, according to the memory card adapter of the present invention, one end of a contact (conductive member) inserted in the through hole of the base is connected to the antenna circuit, and the other end of the contact elastically contacts the antenna connecting terminal of the memory card inserted in the adapter. Therefore, it is possible to ensure the connection reliability between the antenna connecting terminal of the memory card inserted and the antenna circuit, and also extend the communication distance by use of the antenna circuit as a secondary antenna. In addition, since a basic design of a conventional adapter for Mini SD Card can be utilized, it is not necessary to newly design a connector specialized for the present adapter from the ground up. Therefore, there is another advantage that a degree of compatibility with the conventional connector is high. Thus, it is expected to be put into practical use as an adapter suitable for a memory card with the non-contact communication function, e.g., Mini Smart SD Card, the demand for which is expected to increase in the future.

The invention claimed is:

1. A memory card adaptor connectable to a memory card socket of an electronic appliance, and having a loading port at its one end, through which a memory card can be accommodated therein, wherein the memory card adapter comprises:
    a base made of an electrical insulating material;
    a plurality of contacts arranged on an inner surface of said base so as to electrically contact an I/O connecting terminal and an antenna connecting terminal of said memory card inserted in the adapter;
    an antenna circuit formed on an outer surface of said base; and
    a conductive member configured to make an electrical connection between said contact connectable to said antenna connecting terminal of said memory card and said antenna circuit via a through hole formed in said base.

2. The memory card adapter as set forth in claim 1, wherein said contact connectable to said antenna connecting terminal has a spring piece at its one end, which elastically contacts said antenna connecting terminal of said memory card, and the other end inserted as said conductive member into said through hole to make the electrical connection with said antenna circuit.

3. The memory card adapter as set forth in claim 1, wherein said antenna circuit has a loop-like antenna pattern formed along an outer circumference of said base.

4. The memory card adapter as set forth in claim 1, further comprising a magnetic material disposed between said antenna circuit and the outer surface of said base.

5. The memory card adapter as set forth in claim 1, further comprising an electrical insulating layer formed on a surface of said antenna circuit.

6. The memory card adapter as set forth in claim 1, wherein said antenna circuit has an electronic part for regulating a high-frequency property.

7. The memory card adapter as set forth in claim 6, wherein said base has a concave, in which said electronic part is mounted.

8. The memory card adapter as set forth in claim 1, wherein said base having said antenna circuit is a molded interconnect device, which is obtained by integrally molding a desired circuit pattern with a resin material for said base.

* * * * *

UNITED STATES PATENT AND TRADEMARK OFFICE
CERTIFICATE OF CORRECTION

PATENT NO. : 7,601,031 B2  Page 1 of 1
APPLICATION NO. : 11/660216
DATED : October 13, 2009
INVENTOR(S) : Hirohisa Tanaka et al.

It is certified that error appears in the above-identified patent and that said Letters Patent is hereby corrected as shown below:

ON THE TITLE PAGE

Item (73) Assignee should read: Panasonic Electric Works Co., Ltd.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,601,031 B2
APPLICATION NO.   : 11/660216
DATED             : October 13, 2009
INVENTOR(S)       : Hirohisa Tanaka et al.

It is certified that error appears in the above-identified patent and that said Letters Patent is hereby corrected as shown below:

This certificate supersedes the Certificate of Correction issued April 13, 2010. The certificate is vacated since petition under 3.81(b) was not granted to change name of assignee.

Signed and Sealed this
Twenty-third Day of August, 2011

David J. Kappos
*Director of the United States Patent and Trademark Office*